(12) United States Patent
Backes et al.

(10) Patent No.: US 12,155,530 B1
(45) Date of Patent: Nov. 26, 2024

(54) INTENT-DRIVEN NETWORK MANAGEMENT

(71) Applicant: Amazon Technologies, Inc., Seattle, WA (US)

(72) Inventors: John David Backes, Minneapolis, MN (US); Giacomo Bernardi, Bologna (IT); Nikolaos Giannarakis, Seattle, WA (US); Viktor Heorhiadi, Seattle, WA (US); Stephen Callaghan, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/518,751

(22) Filed: Nov. 24, 2023

(51) Int. Cl.
    *H04L 41/08*     (2022.01)
    *H04L 41/0869*     (2022.01)
    *H04L 41/0894*     (2022.01)

(52) U.S. Cl.
    CPC ...... *H04L 41/0883* (2013.01); *H04L 41/0869* (2013.01); *H04L 41/0894* (2022.05)

(58) Field of Classification Search
None
See application file for complete search history.

(56) References Cited

U.S. PATENT DOCUMENTS

| | | | |
|---|---|---|---|
| 10,579,825 B2 * | 3/2020 | Miller | H04W 4/80 |
| 2009/0306894 A1 * | 12/2009 | Noble | G06Q 10/08355 |
| | | | 705/338 |
| 2017/0256256 A1 * | 9/2017 | Wang | G10L 15/26 |
| 2019/0036887 A1 * | 1/2019 | Miller | G07C 9/20 |

* cited by examiner

*Primary Examiner* — Quang N Nguyen
(74) *Attorney, Agent, or Firm* — Klarquist Sparkman, LLP

(57) ABSTRACT

Network management systems and associated methods are described for providing intent-driven management of networks using one or more compilers. An intent identifying an expectation for behavior in a network and entity associations for the intent may be received at a compiler. The compiler may determine one or more artifacts for the respective entities based on the intent. The compiler may output instructions based on the artifacts for the consumers. The instructions may be in a language and/or format corresponding to the consumers.

20 Claims, 13 Drawing Sheets

INTENT-DRIVEN NETWORK MANAGEMENT

BACKGROUND

Computing systems and communication networks may be utilized to exchange information. In some applications, network devices may be provided with configuration information to control how data is communicated through a network. Maintaining proper configurations in the network devices may become difficult as the number of network devices and the complexity of network behavior proposals increase.

DETAILED DESCRIPTION

As described above, managing network operations is difficult when dealing with large quantities of network devices and/or complex network behavior goals. For example, a desired intent for a network may involve changing configurations for numerous network devices in different ways, based on where the devices are located in the network, types of the network devices, interrelationships of the network devices with other components of the network, and/or other considerations. The disclosed technologies provide new approaches to managing networks based on intents, including maintaining a historical account of changes to intents, verifying proposed intents, and observing behavior on the network to detect and mitigate violations of intents. Additional details relating to intent-driven network management are provided below.

Figure 1:
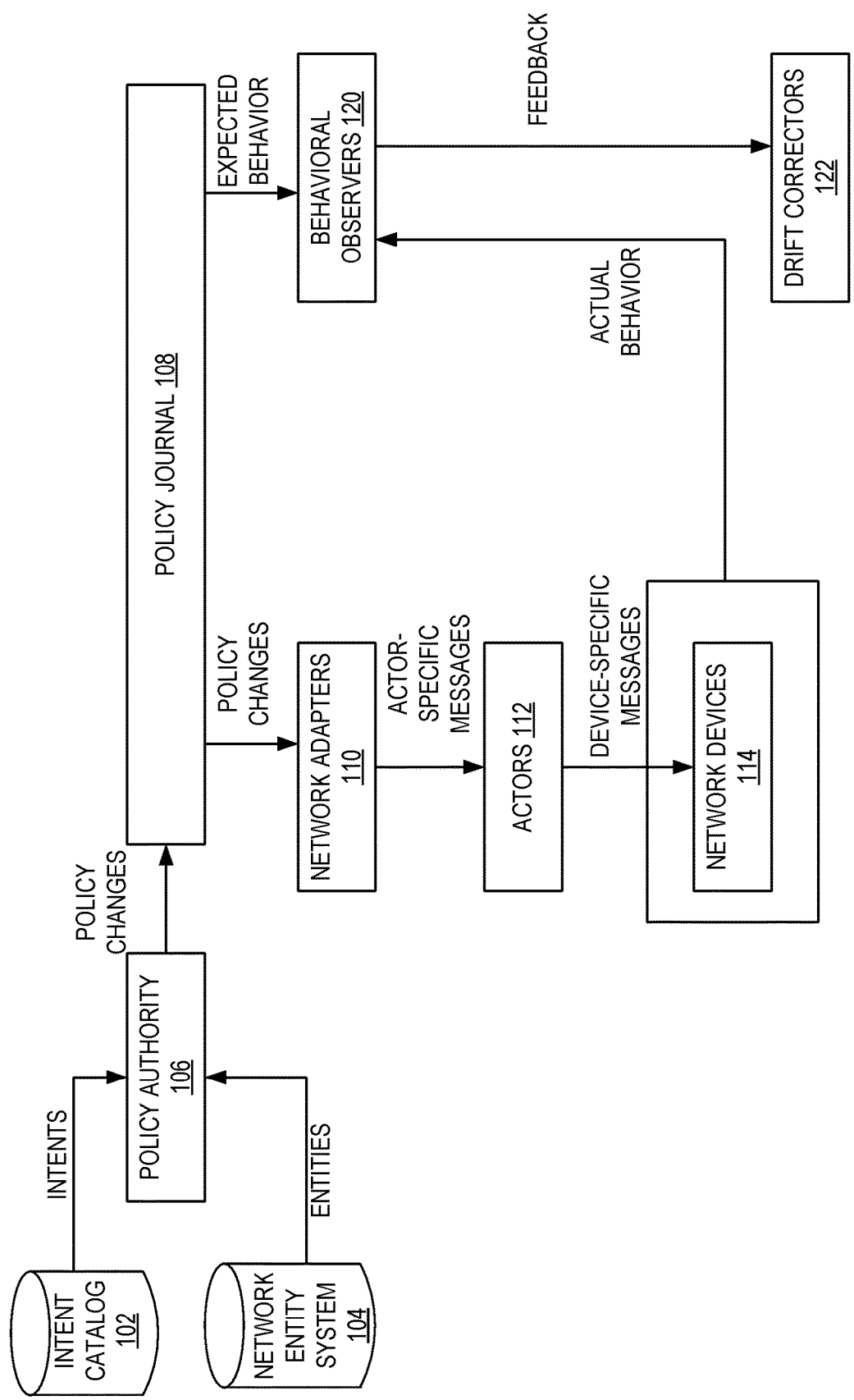
FIG. 1 is a diagram of an example intent-driven network management system including a journal for maintaining information relating to policies reflecting applied intents in the network.

FIG. 1 shows an example intent-driven network management system 100 for controlling how data flows through a network. The management system 100 and/or the components of management system 100 (e.g., policy authority 106, network adapters 110, actors 112, network devices 114, behavioral observers 120, and drift correctors 122) may be implemented using one or more computing systems, examples of which are described in more detail below with respect to FIGS. 12 and 13, including processor(s) configured to execute instructions stored in storage device(s) to perform the operations described herein. Some components of management system 100 (e.g., intent catalog 102, network entity system 104, and/or journal 108) may be implemented using one or more storage devices accessible by the one or more computing systems. The management system 100 and/or other components described herein may also include one or more services. Services are commonly used in cloud computing. A service is a software function provided at a network address over the web or the cloud. Clients initiate service requests to servers and servers process the requests and return appropriate responses. The client service requests are typically initiated using, for example, an API request. For purposes of simplicity, service requests will be generally described below as API requests, but it is understood that other service requests can be made. An API request is a programmatic interface to a defined request-response message system, typically expressed in JSON or XML, which is exposed via the web-most commonly by means of an HTTP-based web server. Thus, in certain implementations, an API can be defined as a set of Hypertext Transfer Protocol (HTTP) request messages, along with a definition of the structure of response messages, which can be in an Extensible Markup Language (XML) or JavaScript Object Notation (JSON) format. The API can specify a set of functions or routines that perform an action, which includes accomplishing a specific task or allowing interaction with a software component. When a service receives the API request from a client device, the service can generate a response to the request and send the response to the endpoint identified in the request.

In the illustrated example, an intent catalog 102 includes a database or other data construct configured to store intents or intent data usable to generate network intents for the network. Additional examples relating to the generation, management, and application of intents is described below with respect to FIGS. 7-11. As used herein, an intent (e.g., a network intent) may refer to a behavior that may not define an exact subject for that behavior (e.g., a specific network device). Intents may include a functional expectation that a user or client has about a network, which may be ultimately implemented by network operations such as routing, filtering, and/or other actions performed by network devices. Intents may be expressed at high-level of abstraction and can be formally verified by using invariants. In contrast to the usage of intended state, configuration snippets representing the desired state which exists on devices (e.g., config to designate a t-shifted status) may be the output of intents, and not an intent in themselves. Intents may be atomic entities, which are guaranteed to be applied transactionally. Intents may be self-standing, rather than being manually interwoven to existing policy sets; for example, the intents may be described in an intent language and may not reference an existing policy, and/or the intents may otherwise be developed, described, and/or able to be processed independently from existing policies. Intents may declare their purpose, how they are to be validated (e.g., Test-Driven-Development style), and/or their application scope (e.g., whether they are to be applied to devices, spans, entities, etc.). Intents may be in the form of business expectations (e.g., policy, topology, hosts, filtering), and may additionally or alternatively be scoped or applied to specific instantiations. Some non-limiting examples of intents include "traffic between any two hosts in autonomous zone A must never leave autonomous zone A." "in region A, avoid local equal cost multi-path routing across paths that span different campuses," "autonomous zone A should not be used to pass transit traffic between any other two autonomous zones." "paths with both servicer A and servicer B options should prefer servicer B for internet traffic in region 2," "enable jumbo frames on a device." "shift a span." etc. While some examples provided herein relate to intents that center around routing behaviors, it is to be understood that intents may relate to other network factors, such as capacity, security, and/or other considerations. In some examples, the intent catalog may include types or templates of intents (e.g., templates written in an intent language that are configured for various types of desired behaviors and provide blanks to be filled in with details for a desired behavior of the respective type corresponding to the template), which may be selected and/or updated to build a proposed intent for a network.

System 100 further includes a network entity system 104, which stores information regarding entities in the network and relationships between entities and/or devices of an entity (e.g., a topology of the network, operational and/or other dependencies of devices and/or services in the network, etc.). For example, as used herein, an entity may refer to a device or set of devices acting as a single logical unit for a kind of desired behavior. For example, entities may include one or more devices, spans, columns, etc. An entity may not imply any specific behavior for the set of devices. Network entity system 104 may comprise a database.

The entities may act as a subject for intents. Accordingly, a policy authority 106 may receive intents and access network entity system 104 in order to determine or map entities to which the intents refer or apply. For example, the policy authority 106 may determine a policy, or an applied intent (e.g., an intent associated with a specific entity), that corresponds to a proposed intent based on the content of the intent and the entities defined for the network. Policy changes made by the policy authority 106 based on incoming intents are propagated to a policy journal 108. The policy journal 108 may store transactions relating to the received policy changes. For example, when a policy change is to be made to the network based on a received intent, the policy journal may create a new transaction corresponding to the policy change, the transaction including a transaction identifier (ID) for the policy change, a content or definition of the policy change, one or more timestamps (e.g., a start time at which the policy change was received and a completion time at which the policy change was successfully instituted on the network), and/or other information regarding the policy change. Further examples of journals are described in more detail below with respect to FIG. 3.

Policy changes recorded in the policy journal 108 may be propagated to network devices (e.g., network devices that are affected by the policy change) using intermediary devices based on the types of network devices. For example, for network devices 114, the policy changes are provided to one or more network adapters 110, which translate the policy changes into actor-specific messages that are provided to one or more actors 112, which generate and send device-specific messages to network devices 114. The actor-specific messages may include actor or adapter-specific changes based on the type of network devices being updated to implement the policy. In some examples, the device-specific messages may be API calls and/or device configurations to control the devices to operate in compliance with the policy changes. Examples of the network devices 114 include switches, routers, and other devices.

In order to ensure that network devices remain synchronized and intents are being met, behavioral observers 120 are configured to identify expected (e.g., intended and/or desired) network behavior based on the policies in policy journal 108 and compare the expected network behavior to actual behavior of the network and/or network devices. Feedback of this comparison may be provided to one or more drift correctors 122, configured to perform mitigation operations and/or inform users (e.g., administrators or other network controlling entities) of differences between expected and actual behavior on the network. As described in more detail below with respect to FIGS. 2 and 5, the drift correctors may be configured to determine a cause (or a likely cause) of any deviations from expected behavior, for example, based on a timing of the deviations and timestamps of intent/policy change transactions in the policy journal 108. In some examples, the mitigation may include rolling back one or more transactions, as described in more detail below.

Figure 2:
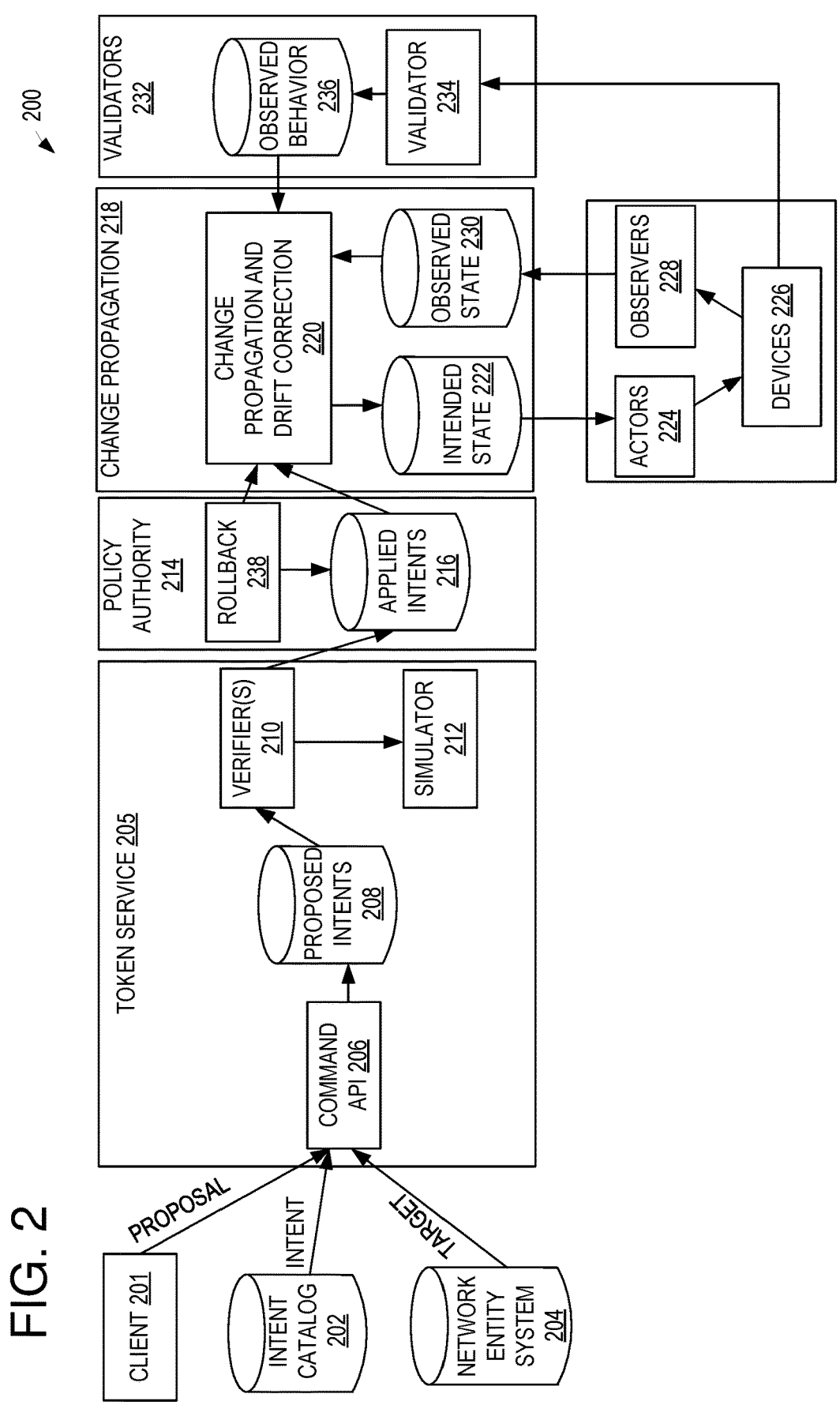
FIG. 2 is a diagram of an example system configured to manage network intents for a network including validation and drift correction.

FIG. 2 is a diagram of an example system configured to manage network intents for a network including validation and drift correction. The system 200 may be implemented using one or more computing systems including processor(s) configured to execute instructions stored in storage device (s), examples of which are described in more detail below with respect to FIGS. 12 and 13. The system 200 may include an intent catalog 202 and a network entity system 204, which may be examples of the intent catalog 102 and network entity system 104 of FIG. 1, features of which are described in more detail above. A token service 205 may correspond to a pre-approval and/or gating stage in which a command Application Programming Interface (API) 206 receives information from the intent catalog 202, the network entity system 204, and a client 201 corresponding to a proposed intent for behavior for the network. The proposed intent may be stored in a proposed intents database 208. The token service 205 may further include one or more verifiers 210 and simulators 212 configured to process the proposed intents from database 208 and determine whether the proposed intents are approved for use (e.g., whether the proposed intents are allowed to be applied to the network).

For example, the verifiers 210 may include a functional verifier configured to utilize simulator 212 to perform formal verification, simulation, and signoffs on the intents, optionally utilizing one or more third-party or remote systems. The simulator 212 may take in a proposed intent as input and run a simulation of applying the proposed intent to determine whether applying the proposed intent would violate another applied intent, or otherwise fail to meet a criterion of the network (e.g., a service-level agreement (SLA) or other parameter for the network). In some examples, the verifiers 210 and/or simulator 212 may utilize automated reasoning to rationalize what effect any changes relating to the proposed intent will have on the rest of the system, in order to determine whether the proposed intent is to be allowed to be applied to the network. The verifiers 210 may additionally or alternatively include a change control verifier, which may ensure that a proposed intent is able to be applied in light of change control rules, such as those defined by a contingent access enforcement or other services, which may specify restrictions on times, days, or types of changes that are allowed for the network. In some examples, an approval API may be included in the token service 205 to enable an approval user to provide approval input (e.g., to grant or deny, or designate restrictions for changes) for proposed intents.

The token service 205 may generate a token for proposed intents that indicate whether the respective proposed intent is verified. For example, if a proposed intent is verified, the proposed intent is issued a corresponding approval token (e.g., with a timestamp and/or other information indicating when the intent was approved), and then passed along to an applied intents journal 216 of a policy authority 214. The applied intents journal 216 may be an example of the policy journal 108 of FIG. 1, and features described with respect thereto may also relate to applied intents journal 216. The applied intents journal 216 may indicate a status of applied intents, such as a time at which the applied intents were approved (e.g., based on the timestamp of the token as described above) and an indication of a synchronization status (e.g., how far along a rollout of devices changes to apply the intent has progressed).

For example, a change propagation service 218 may include a change propagation and drift correction service 220 configured to determine when a new intent is added to the applied intents journal 216 and control the distribution of updated device configurations or other data to change device states for affected network devices (e.g., examples of which are described in more detail above with respect to FIG. 1). Intended states for devices may be stored in intended state database 222 and provided to actors 224 for propagation to network devices 226 in order to control the network to behave in compliance with the new intent. One or more observers 228 may monitor the devices 226 to determine actual exhibited behavior and/or observed states of the devices after applying the intended configurations and store the results of the observations in an observed states database 230. The change propagation and drift correction service 220 may compare the intended states in the intended states database 222 to the observed states in the observed states database 230 to determine if there is a difference (e.g., if any of the applied intents in the applied intents journal 216 are being violated due to a lack of synchronization of device states). As described herein, the intended and observed states may be states of the devices and/or states of the network in some examples.

In addition, validators 232 may include a validator 234 configured to monitor behavior of the network devices 226 and store the information as observed behaviors in observed behavior database 236. The change propagation and drift correction service 220 may compare the observed behavior in observed behavior database 236 to expected behavior determined based on the applied intents in the applied intents journal 216 to determine if any of the applied intents are being violated. Alternatively, the validators 232 may perform the comparison and alert the change propagation and drift correction service 220 of any drift (e.g., violated intents). If there is any issue with the configurations or behaviors monitored as described above, the change propagation and drift correction service 220 may be responsible for performing drift correction, which may include performing a rollback of one or more transactions in the applied intents journal 216 based on input from a rollback service 238. For example, a time at which a violation of an intent is discovered may be compared to timestamps in the applied intents journal 216 to determine a change to the journal (e.g., an addition of an intent) that occurred most recently (prior to) the violation. The transaction for that intent may be selected to be reversed (e.g., a "get revert" operation may be performed on the transaction to change the system to reflect an inverse of that transaction) to perform the rollback operation, without changing any other intents in the journal (e.g., any prior or subsequently added intents that are not related to the selected intent). In examples where the transaction is one of a set of related transactions, all or a subset of the related transactions in the set may be reversed to perform the rollback.

The rollback operation may work similarly to a new change transaction, with different constraints (e.g., completeness and correctness criteria sets) for performing the rollback. For example, changes to add new intents may have rules, such as a time frame in which the change must be implemented (e.g., a number of seconds or minutes allotted to perform operations such as propagating the change to the change propagation and drift correction service 220, rolling out device configurations to network devices, etc.), validation rules (e.g., new intents may not be allowed to conflict with applied intents, as described above), etc. Changes to rollback intents after drift detection may provide shorter time frames for completion, may allow the rollback to be accepted even if only partially applied in that time frame, may allow the rollback to be applied even if it violates an intent (e.g., after applying the rollback, the violation of the other intent may be indicated as a further drift to allow for additional mitigation), etc.

Figure 3:
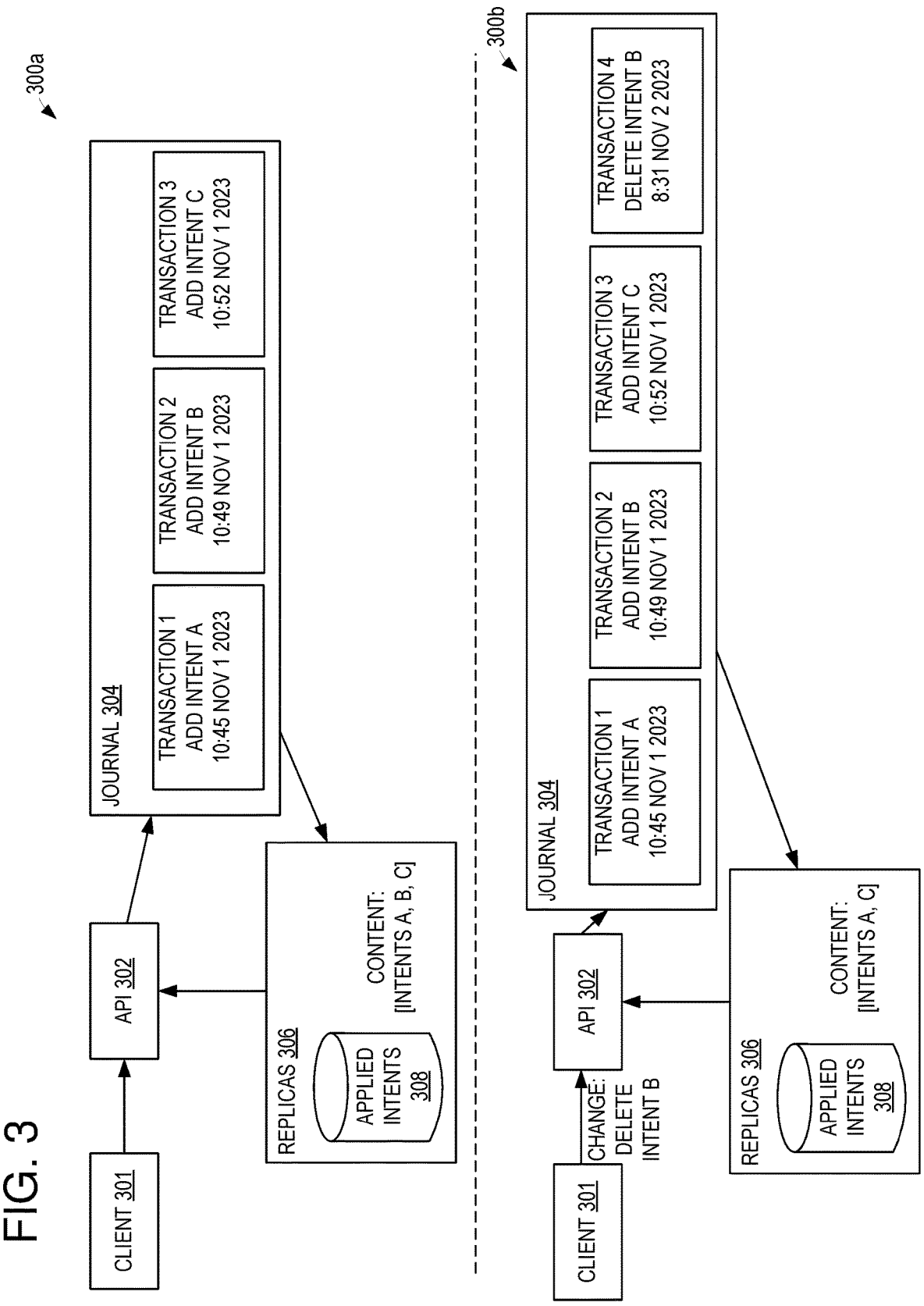
FIG. 3 illustrates an example of a journal for tracking transactions relating to intent-driven network management.

FIG. 3 shows an example of how a journal may be updated to track changes in network management according to examples of the present disclosure. Journals may correspond to an authority that tooling and telemetry services of the network may use as a source of truth regarding how a system is behaving or is intended to behave. Disparate components of the network may connect to the journals to keep the network in sync and provide a durable, accessible, scalable infrastructure for managing the network. For example, the journal described in FIG. 3 may be an example of the policy journal 108 of FIG. 1, the applied intents journal 216 of FIG. 2, and/or one or more other journals, such as an operational/state journal (e.g., tracking which network devices are in operation and/or a state of network devices), prefix journal (e.g., tracking a distribution of prefixes in the network), configuration drift and/or behavioral drift journals (e.g., tracking detected drift in the network relating to expected configurations or behaviors, as described above with respect to FIG. 2), and/or other journals.

As shown in state 300a of the journaling system shown in FIG. 3, a client 301 may connect to an API 302 to provide changes to a journal 304. In the initial state of 300a, the journal 304 includes three transactions, each detailing an event to, in this case, add different intents to the journal (e.g., transaction 1 is for adding intent A, transaction 2 is for adding intent B, etc.). The transactions may include parameters such as a transaction ID (e.g., "transaction 1"), an operation associated with the transaction (e.g., "Add intent A"), a timestamp for the transaction (e.g., "10:45 Nov. 1 2023"), and/or other information. As described above, multiple timestamps may be included for the transaction, such as a timestamp indicating when the change associated with the transaction was approved, a timestamp indicating when the change was completed in the network, etc. As described above, the journal 304 may be a source of truth for changes relating to the journal (e.g., applied intent changes in the illustrated example). One or more replicas 306 may include information corresponding to a state of the network that is based on the changes indicated in the journal 304. For example, in state 300a, the replicas 306 include a database of applied intents 308 that includes intents A, B, and C (in light of the addition of these intents via transactions 1, 2, and 3, respectively).

In state 300b of FIG. 3, the client 301 requests a change to delete intent B for the network. Once the change is approved, the journal 304 is updated as shown to include a transaction corresponding to the deletion of intent B, having a transaction ID in this example of "transaction 4." In response to completing the transaction, the replicas 306 now reflect in the applied intents database 308 an updated state of the network in which only intents A and C are present (due to the deletion of intent B).

Figure 4:
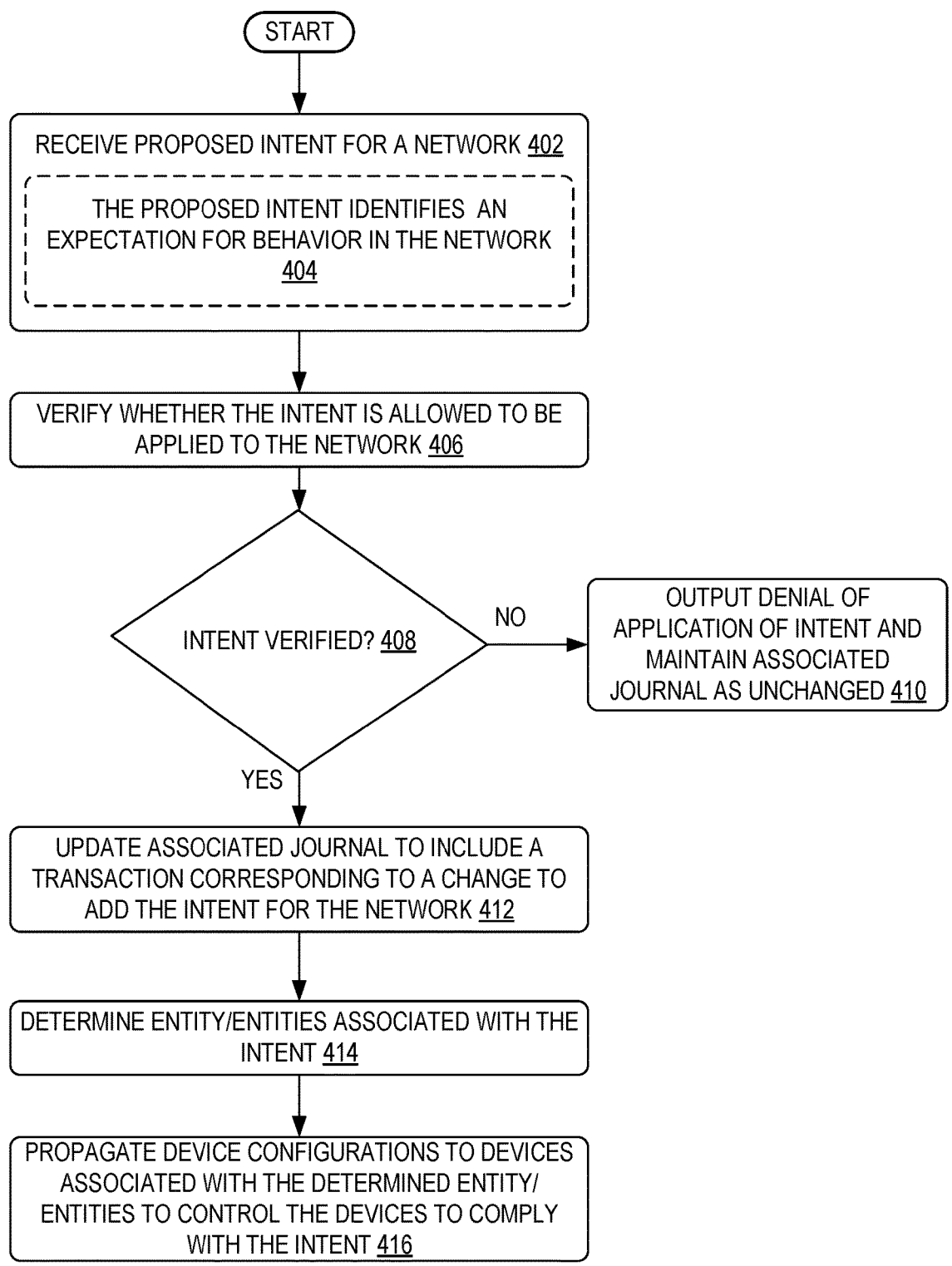
FIG. 4 is a flow chart of an example method of managing intents for a network.

FIG. 4 shows a flow chart of an example method 400 for managing intents in a network. Method 400 may be performed by an intent-driven network management system, such as management system 100 of FIG. 1 and/or management system 200 of FIG. 2 (e.g., and associated components as described above with respect to FIGS. 1 and 2), to control behavior in a network. At 402, the method includes receiving a proposed intent for a network. As indicated at 404, the proposed intent may identify or reflect/define an expectation for behavior in the network.

At 406, the method includes verifying whether the intent is allowed to be applied to the network. For example, as described above with respect to FIG. 2, a verification may include determining if the intent violates any existing intents (e.g., based on a simulation or other processing of the intent). If the intent is not verified (e.g., if the intent is not allowed to be applied, "NO" at 408), the method includes outputting a denial of application of the intent and maintaining an associated journal (e.g., a policy or applied intents journal) as unchanged, as indicated at 410. For example, a transaction for changing the network to include the proposed intent may not be added to the journal and network device configurations may not be changed to reflect the intent.

If the intent is verified (e.g., if the intent is allowed to be applied, "YES" at 408), the method includes updating an associated journal (e.g., a policy or applied intents journal) to include a transaction corresponding to a change to add the intent for the network. For example, as described above with respect to FIG. 3, the journal may be updated to include a new entry that includes a transaction ID and timestamp(s) for the proposed intent.

At 414, the method includes determining one or more entities associated with the intent. For example, as described above with respect to FIG. 1, entities that are a subject of an intent may be defined by a network entity system. At 416, the method includes propagating device configurations to devices associated with the determined entity or entities to control the devices to comply with the intent. For example, the device configurations may update routing tables, filtering instructions, and/or other configurations of the network devices to ensure that the network behaves as specified in the intent.

Figure 5:
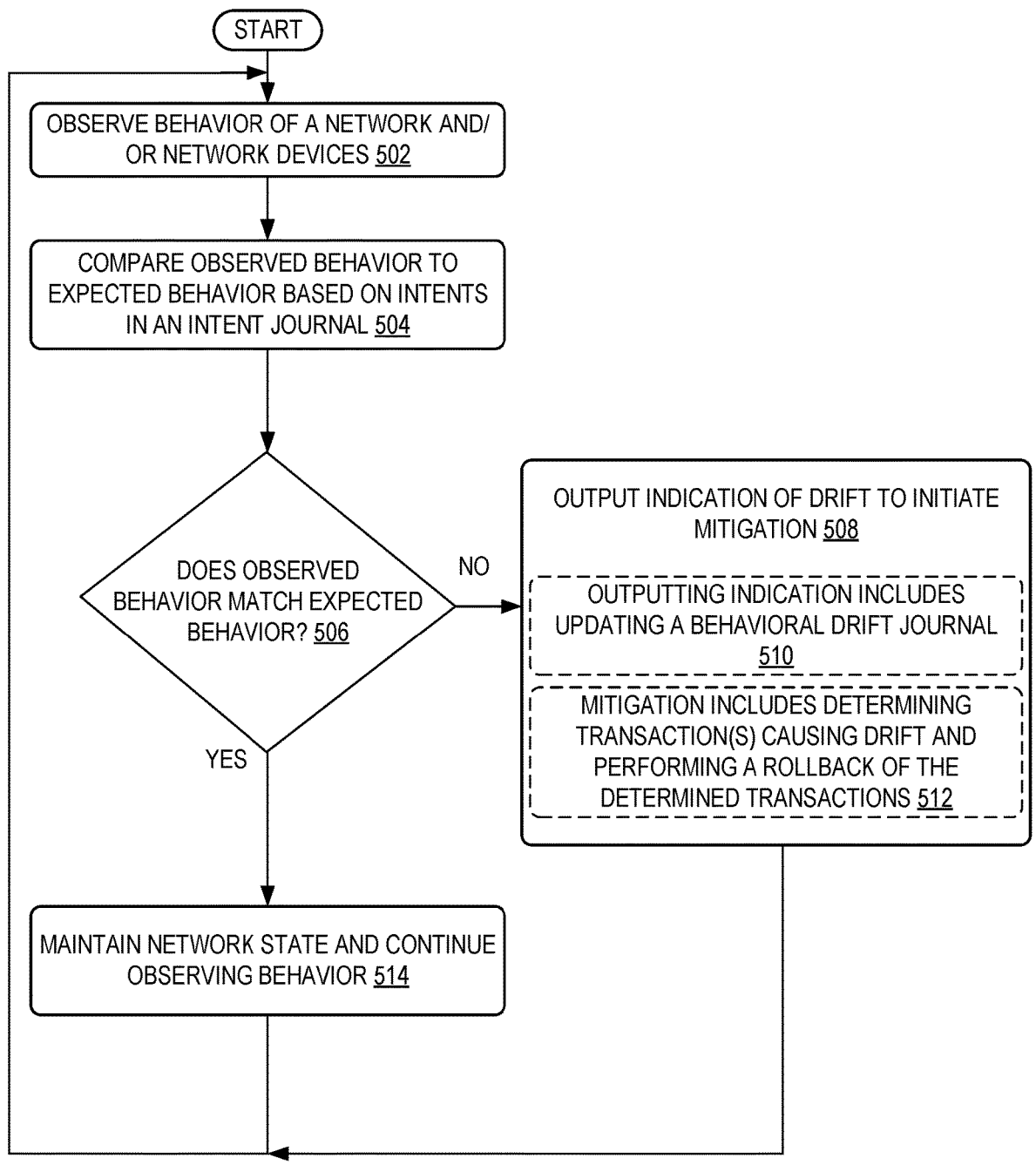
FIG. 5 is a flow chart of another example method of managing intents including identifying differences between observed and intended behaviors in the network.

FIG. 5 shows a flow chart of an example method 500 for managing intents including identifying differences between observed and expected (e.g., intended and/or desired) behaviors in the network. Method 500 may be performed by an intent-driven network management system, such as management system 100 of FIG. 1 and/or management system 200 of FIG. 2 (e.g., and associated components as described above with respect to FIGS. 1 and 2), to control behavior in a network. At 502, the method includes observing a behavior of a network and/or network devices in the network. For example, traffic flows, routing decisions, filtering output, and/or other behavior may be monitored.

At 504, the method includes comparing the observed behavior to expected behavior based on intents in an intent journal. For example, the expected behavior may be determined based on a single source of truth—an intents (or policy) journal, such as the journals described above with respect to FIGS. 1-3. At 506, the method includes determining if the observed behavior matches the expected behavior. If the observed behavior matches the expected behavior (e.g., the observed behavior indicates operation within a threshold of an expected network behavior and/or no violations of intents in the applied intents journal are detected; "YES" at 506), the method includes maintaining the network state and continuing to observe behavior, as indicated at 514.

If the observed behavior does not match the expected behavior (e.g., the observed behavior indicates operation outside of a threshold of an expected network behavior and/or one or a threshold number of violations of intents in the applied intents journal are detected; "NO" at 506), the method includes outputting an indication of drift in order to initiate a mitigation of the mismatch, as indicated at 508. As indicated at 510, outputting the indication may optionally include updating a behavioral drift journal, which may include an example of a journal as described above with respect to FIG. 3 that is configured to track instances of intent violations (or drift) detected in the network. As indicated at 512, the mitigation that is initiated may optionally include determining one or more transactions causing the drift and performing a rollback of the determined transactions, as described in more detail above with respect to FIG. 2. In other examples, mitigation may include updating an intent that is violated (or issuing a change to replace the violated intent with a new intent) to allow for the condition causing the violation. For example, if an intent specifies that span A should only process local traffic, but outside traffic is observed on span A during a failure condition, the intent may be updated/replaced to allow outside traffic during a failure condition, but still mandate that the span only processes local traffic in non-failure conditions. In further examples, mitigation may include outputting a ticket for addressing the drift, where the ticket includes an indication of the intent that was violated, details regarding the violation (e.g., behaviors that were observed to be different than expected), device(s) involved in the violation, a time at which the violation was observed, and/or other information that may be usable by a human operator or automated ticket processing system to make adjustments to the network to address the drift. The method may then return to continue observing behavior. In some examples, the network device(s) and/or behaviors relating to the drift may be targeted for observation to ensure that the drift is corrected. In additional or alternative examples, behavior identified as drift at 504 may be ignored for a threshold period of time after the output at 508 and/or associated mitigation in order to allow time to mitigate an underlying issue before alerting about the drift again.

Figure 6:
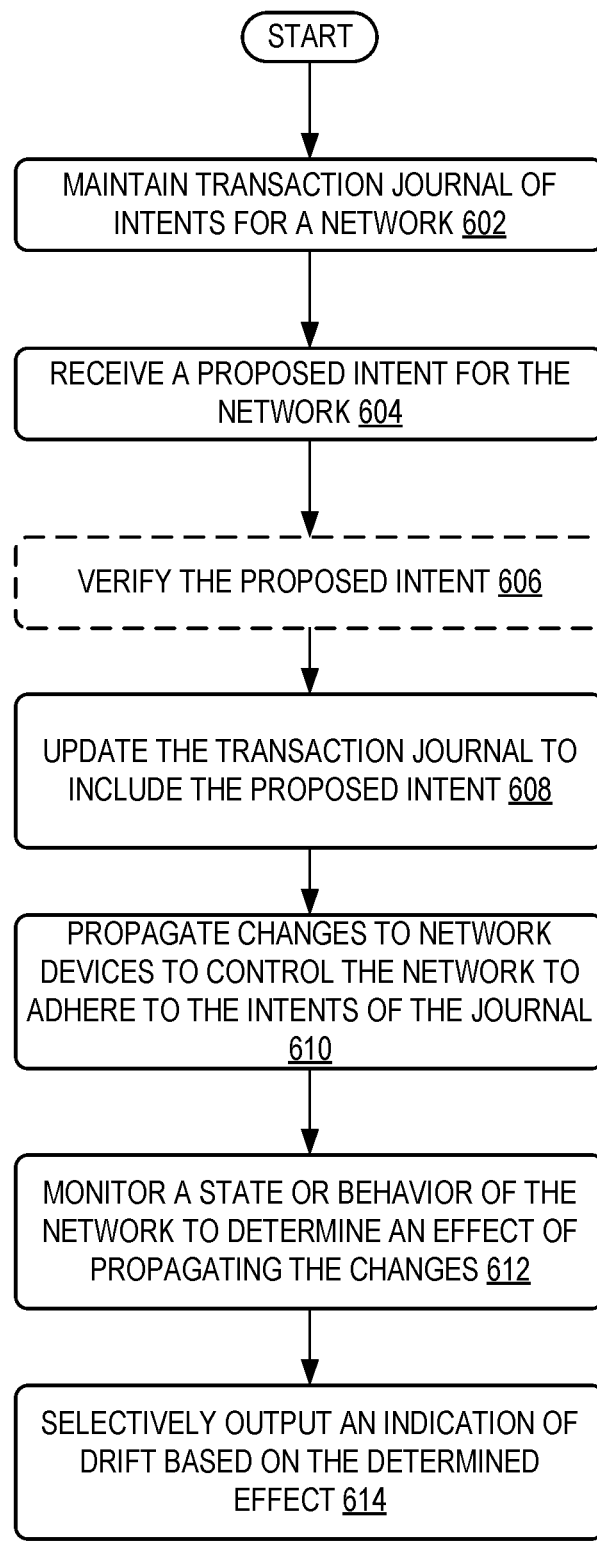
FIG. 6 is a flow chart of another example method of managing intents for a network.

FIG. 6 shows a flow chart of an example method 600 for managing intents in a network. Method 600 may be performed by an intent-driven network management system, such as management system 100 of FIG. 1 and/or management system 200 of FIG. 2 (e.g., and associated components as described above with respect to FIGS. 1 and 2), to control behavior in a network. At 602, the method includes maintaining a transaction journal of intents for a network. For example, the transaction journal may be maintained (e.g., stored and configured for use) as described above with respect to journal 304 FIG. 3 and/or as described above with respect to policy journal 108 of FIG. 1 or applied intents journal 216 of FIG. 2.

At 604, the method includes receiving a proposed intent for the network. For example, the proposed intent may be provided by a user or client using an API to connect to a verification service and/or policy authority that manages the journal. At 606, the method optionally includes verifying the proposed intent. For example, the proposed intent may be verified to determine an effect of changes corresponding to the proposed intent and whether such changes will cause a violation of another intent and/or violate a change restriction, as described in more detail above with respect to FIG. 2.

At 608, the method includes updating the transaction journal to include the proposed intent. In some examples, the updating may include selectively updating the transaction journal to include the proposed intent based on the verification performed at 606. For example, if the proposed intent is verified, the transaction journal may be updated to include the intent as a policy change. If the proposed intent is not verified, the transaction journal may not be updated to include the intent as a policy change.

At 610, the method includes propagating the changes to network devices to control the network to adhere to the proposed intent. For example, policy changes corresponding to the proposed intent may be used to generate device changes that are provided to network devices to control the network devices to process communications in a manner that is configured to cause the network to behave in accordance with the proposed intent, as described in more detail above with respect to FIGS. 1 and 2.

At 612, the method includes monitoring a state or behavior of the network to determine an effect of propagating the changes. For example, a state of devices and/or services in the network may be monitored to ensure they remain in sync (e.g., as described above with respect to the comparison of the intended state 222 and the observed state 230 in FIG. 2) and/or behavior of the network may be monitored to ensure it remains in line with expected and/or intended behavior and/or to ensure that the network is not violating any applied intents in the journal (e.g., as described above with respect to the validators 232 of FIG. 2).

At 614, the method includes selectively outputting an indication of drift based on the determined effect. For example, the indication of drift may be output if a difference between expected and/or intended behavior and/or state it determined as a result of the monitoring at 612. In some examples, the indication of drift may include and/or be usable to generate instructions to perform a mitigation operation, such as an issuance of a ticket, an adjustment to an existing intent (e.g., to allow for an exception that addresses the drift), a rollback of one or more transactions in the journal, etc., examples of which are described in more detail above.

As described above, the disclosed technologies utilize intents to describe desired behavior in a network. FIGS. 7-11 describe features relating to generating, managing, and applying the intents, for example with the use of one or more compilers. The compilers and associated features may be used in coordination with the systems and methods described above with respect to FIGS. 1-6 in some examples, or in other example applications without departing from the scope of this application.

Figure 7:
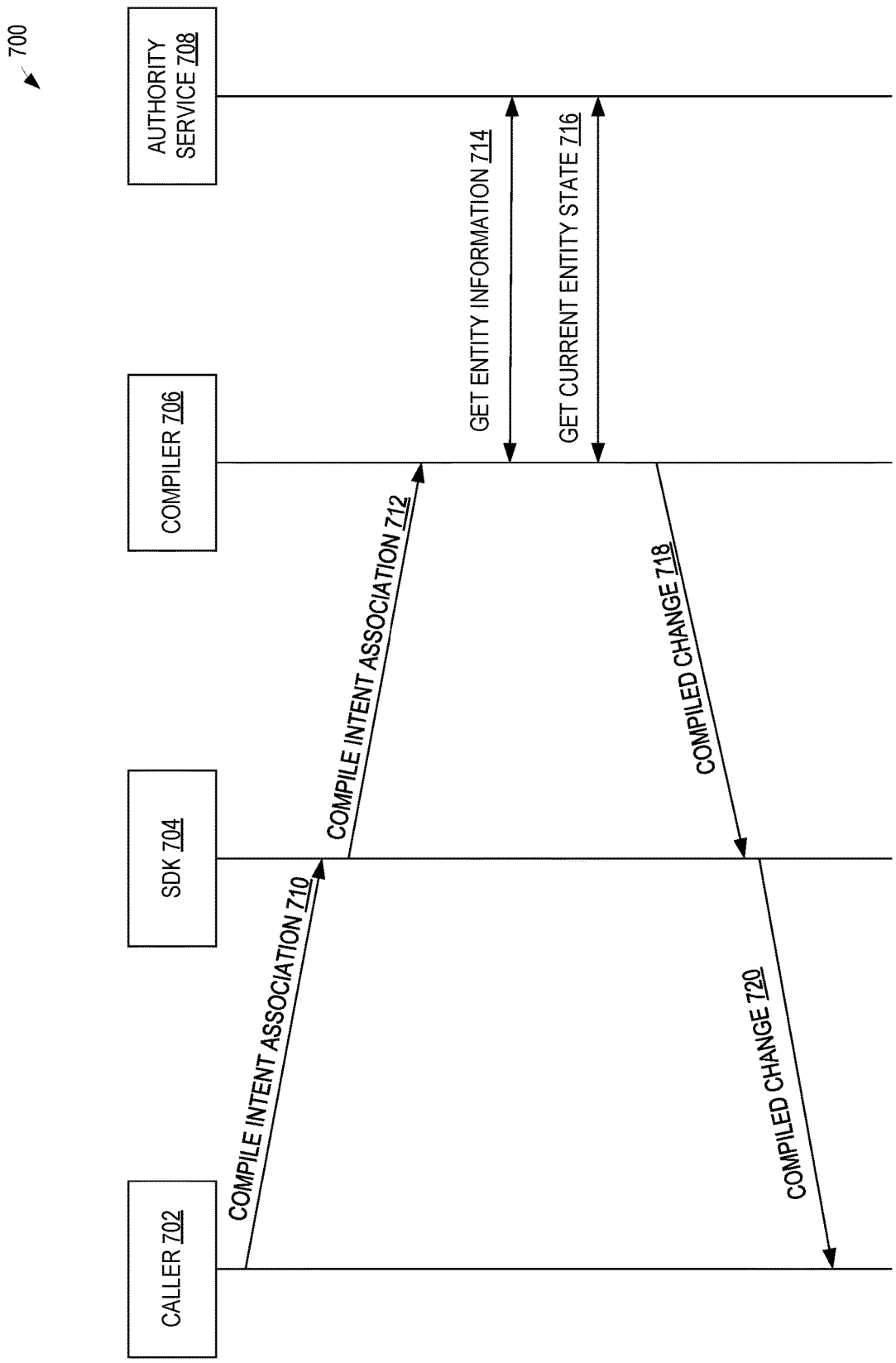
FIG. 7 shows a communication diagram illustrating an example use of a compiler to process intents.

FIG. 7 shows a communication diagram 700 illustrating an example use of a compiler to process intents, and includes communications between a caller 702, a software development kit (SDK) 704, a compiler 706, and an authority service 708. The compiler 706 may be responsible for interpreting intents (e.g., written in an intent language, which may allow users to specify a type of behavior that is desired for the network without specifying how to implement the behavior) and producing output targeted at consumer devices/systems (e.g., where the compiler determines how to implement the behavior specified in the intent and generates output to effect changes in devices to implement the behavior). The compiler 706 may be a source of truth for the semantics of intent content. In an example compiling process, the caller 702 sends a request to compile an intent association to the SDK 704, as indicated at 710. The caller 702 may include services that include the compilers (e.g., adapters, actors, and/or change propagators such as network adapters 110 of FIG. 1, actors 224 of FIG. 2, and change propagation and drift correction service 220 of FIG. 2, verifiers, such as verifiers 210 of FIG. 2, validators such as validator 234 of FIG. 2, and/or other test authorities or schedulers), which may propagate outputs to one or more consumers (e.g., devices and/or services for implementing an intent, performing a test, etc.). The intent association may be a requested or proposed association between an intent and one or more entities, as described above with respect to FIGS. 1 and 2. The SDK 704 exposes entry points into the compiler 706 and passes the request to the compiler 706, as indicated at 712.

Accordingly, the compiler 706 takes as input intent association or disassociations (e.g., changes) and processes the input. The compiler 706 may reach out to authority services to get up-to-date information about the entities and their intent associations through one or more calls to the authority services. FIG. 7 shows two example calls for such up-to-date information, including, at 714, where the compiler 706 sends a request to get entity information to the authority service 708 (and receives the requested information) and at 716, the compiler 706 sends a request to get current entity state or status to the authority service 708 (and receives the requested information). The entity information retrieved at 714 may include existing associations between entities and/or between entities and applied intents in the network and/or ongoing configurations of entities in the network, and the entity state or status retrieved at 716 may include an operating status of entities (e.g., whether entities are in service) and/or other state information for the entities. The authority service 708 may include a computing service executing on one or more computing systems configured to manage policies or other aspects of the network. Policy authority 106 of FIG. 1 and policy authority 214 of FIG. 2 are examples of authority services that could include and/or be included in authority service 708 and used to manage and/or retrieve entity information and/or associations.

The compiler 706 processes the intent association using the retrieved entity information/state retrieved at 714 and 716 and generates a compiled change, which is sent to the SDK 704 at 718 and propagated from there to the caller 702 at 720. The compiled change may include files, text, control instructions, and/or other data that is configured for one or more targeted devices to control the devices to operate in compliance with the intent. For example, the compiler 706 may transform intent-based authoritative inputs and operator-provided hints (e.g., urgency) into a format desired by downstream consumer devices/systems. In this way, the compiler may operate as a polyglot that is able to provide output in any of a plurality of possible languages and/or formats, where the language and/or format that is selected for the output is based on a targeted consumer of the output (e.g., a type of device that is being changed to implement an input intent).

Figure 8:
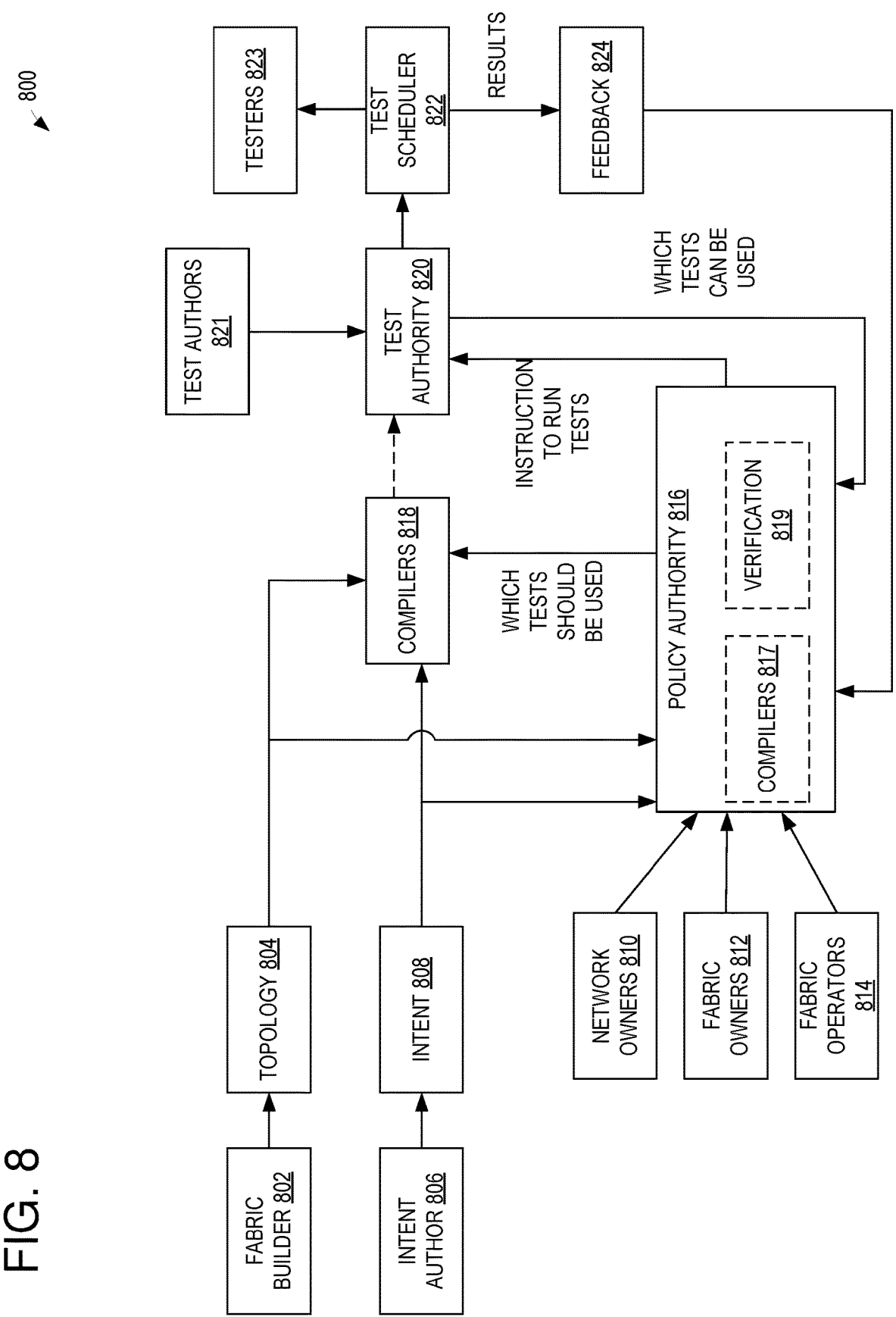
FIG. 8 shows an example of a system that includes compilers used for verification testing to verify proposed intents.

The compiler 706 described above may be located at different points in a system, depending on the configuration of the system. Compilers may be used to initiate verification in some examples, effectively performing admission control of a new intent association, and may be used to facilitate the admission of verified intents. In any of the above-described roles, the compilers may be configured as a polyglot that takes in intents and/or intent associations as input and outputs information and/or instructions to relevant parties (based on the intent and the task, such as verification/checking a new intent, implementing a verified intent, or validating an implemented intent) in a native or otherwise compatible language and/or format for the respective parties. For example, in the system 100 of FIG. 1, compilers may be located in adapters 110 and/or controllers 116 and in the system 200 of FIG. 2, compilers may be located in the verifiers 210, the change propagation and drift correction service 220, and/or other components. FIG. 8 shows an example of a system 800 that includes compilers used for verification testing to verify new/proposed intents. System 800 may be implemented using one or more computing systems including processor(s) configured to execute instructions stored in storage device(s), examples of which are described in more detail below with respect to FIGS. 12 and 13.

System 800 includes a fabric builder 802, which generates and/or provides information relating to a topology of a network that is stored in a topology repository 804. In some examples, the topology information may include the topology of the network and/or information regarding entities in the network, as described above with respect to network entity system 104 of FIG. 1 and network entity system 204 of FIG. 2. An intent author 806 generates and/or provides information relating to intents for the network, which are stored in an intent repository 808. In some examples, the intent information may include information from an intent catalog, as described above with respect to the intent catalog 102 of FIG. 1 and intent catalog 202 of FIG. 2.

Intent behavior corresponding to an intent from intent repository 808 (e.g., a proposed intent) and the topology information from topology repository 804 may be provided to policy authority 816 and compilers 818. The policy authority may also receive information from network owners 810, such as network-wide policies, information from fabric owners 812, such as fabric policies, and information from fabric operators 814, such as urgency information (e.g., information regarding when changes should be made to a network and/or how urgently different types of changes are to be applied to a network), and may process the received information to generate policies corresponding to input proposed intents. Prior to accepting and implementing a proposed intent, however, the intent may be subjected to pre- and/or post-checks to determine whether the proposed intent is allowed to be implemented in the network. For example, as described in other examples above, the intent may be verified to ensure that it does not violate another intent, to ensure that changes to implement the intent are allowed to occur (e.g., based on timing constraints for changing the network and/or other rules, examples of which are described above with respect to verifiers 210 of FIG. 2).

As shown in FIG. 8, a test authority 820 may receive test configurations or other testing data from test authors 821 to control and/or build tests for the verification process. The test authority 820 may correspondingly provide information to the policy authority 816 to indicate tests that can be (or are available to be) used to verify intents. Based on the information from the test authority, the policy authority 816 may determine which test(s) should be used for an input intent from intent repository 808 and provide an indication of those test(s) to compilers 818 and/or compilers 817, and the compilers 818 and/or compilers 817 may generate output to implement the tests indicated by the policy authority 816.

The test authority 820 may send instructions to a test scheduler 822 to schedule the performance of targeted test(s) indicated to be used by the policy authority 816, and the test scheduler 822 may send instructions to one or more testers 823 to perform the targeted test(s). In some examples, the output from compilers 818 may be used by the test scheduler 822 to send instructions to one or more testing services or other devices of the testers 823 to implement the targeted test(s). The test scheduler 822 may receive a result of the tests from the testers 823 and may provide and/or store the results as feedback 824, which is sent to the policy authority 816. For example, if the tests indicate that the proposed intent is verified, the policy authority 816 may generate a token or otherwise indicate that the proposed intent is verified (e.g., and send an indication of the verified intent to a change service, as described above with respect to change propagation and drift correction service 220 of FIG. 2) and/or may store the proposed intent in an applied intents journal, an example of which is shown as applied intents journal 216 of FIG. 2.

In some examples, verification checks may be performed in-line, in which case the policy authority 816 may include compilers 817 and verification service 819, which may be used to verify a proposed intent in a similar manner as described above with respect to compilers 818 and test authority 820. The compilers 817 may take in a proposed intent from intent repository 808 and association information for the proposed intent (e.g., based on topology information from topology repository 804), and generate output for implementing a verification test using verification service 819. The output may be in a language and/or format compatible with devices that are performing the verification (e.g., a native language or format), and a result of the verification may be used to determine whether the proposed intent is verified (and thus stored in a journal and/or implemented via a change service, as described above).

Figure 9:
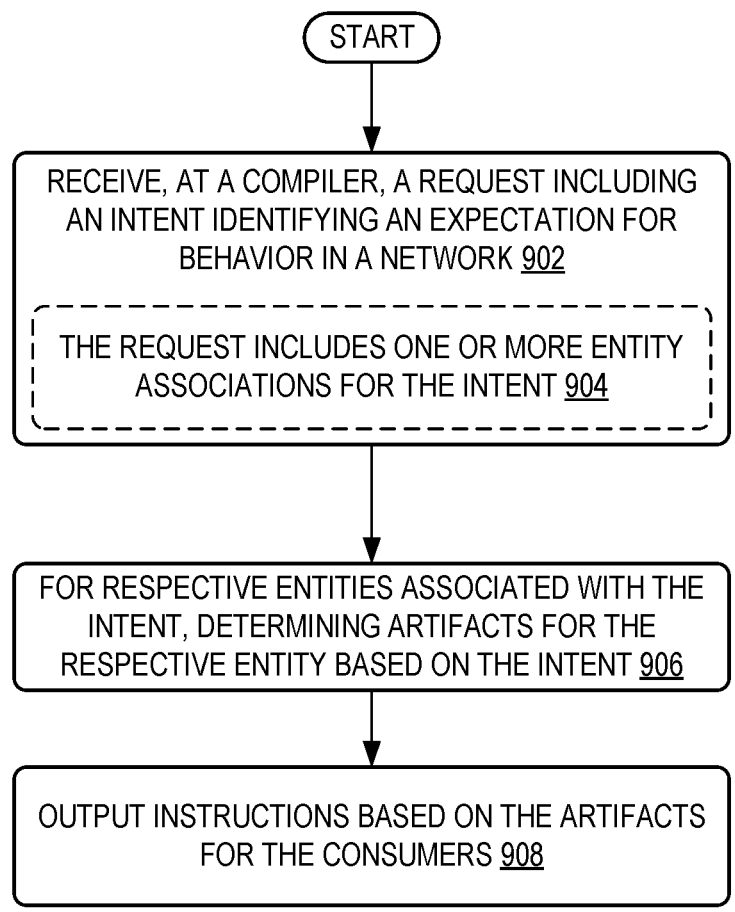
FIG. 9 is a flow chart of an example method for processing intents with a compiler.

FIG. 9 is a flow chart of an example method 900 for processing intents with a compiler. For example, method 900 may be performed by one or more of the compilers described herein, including compiler 706 of FIG. 7 and compilers 817 and 818 of FIG. 8. At 902, the method includes receiving, at a compiler, a requesting including an intent identifying an expectation for behavior in a network. For example, as described above, the intent may be provided in an intent language and/or may provide an indication of a desired behavior for the network (e.g., without specifying how the behavior is to be implemented).

As indicated at 904, the request may include one or more entity associations for the intent. For example, along with the intent (e.g., a new, proposed intent), the compiler may receive associations for the intent, identifying entities associated with the intent. The compiler may also receive and/or access (e.g., from an authority service, as described above with respect to FIG. 7) information relating to a topology of the network, status information for entities/devices of the network, and/or otherwise identify information regarding entities/devices of the network in order to determine how entities are associated with the intent and to determine existing (e.g., applied) associations for those entities. For example, if an intent relates to a desired behavior to prevent traffic from leaving an autonomous zone, the compiler may determine associations between the autonomous zone identified in the intent and entities/devices in the network, as well as associations between existing (e.g., applied) intents on the network and the entities/devices in the network. In some examples, the request may include tuples of intents and entities, which may indicate multiple associations of entities with intents.

At 906, the method includes, for respective entities associated with the intent, determining artifacts (e.g., generating a configuration) for the respective entity based on the intent. For example, the artifacts and/or configuration may include a file, instructions, and/or other data consumable by the entity or devices in the entity to control the entity (or devices in the entity) to operate in compliance with the intent. The artifacts may include API calls to a controller, network policies and/or configurations for a network device, tests that are to be run for network devices and/or services, and/or other data. As described above with respect to FIG. 7, the compiler may be configured to determine an association between the intent and the respective entity using entity information and entity state retrieved from an authority service. As a non-limiting example, a telemetry system may have its own language that the compiler is aware of (e.g., a language that is compatible with and/or understandable by the telemetry system), so the compiler may cross-compile, from a native authority service, information that is on a transaction journal out to the telemetry system. For example, based on the intent language, the compiler may recognize that a consumer is a type that only cares about behavioral validations, so the compiler generates a compiled output of behavioral intent associations for an availability zone for that consumer in the consumer's native language.

As described above, the compiler may be a polyglot that is able to generate output in different languages and/or formats based on a consumer of the output. Accordingly, at 908, the method includes outputting instructions based on the artifacts for the consumers. For example, data relating to the artifacts (e.g., relevant data from the configuration) may be output to the consumers in a native (e.g., compatible) language and/or format for consumers included in the entities (e.g., devices of the entities).

The compiler may determine the artifacts and the instructions by analyzing a type of device or service determined to be a consumer of the instructions, and determining types of artifacts that are suited for the device or service. As a non-limiting example, an intent may include a maintenance intent and an entity associated with the intent may be a router. Based on logic in the compiler and a type of the router, the compiler may generate instructions to shift the router by applying a maintenance policy to the route, which includes Border Gateway Protocol content that is different than a nominal routing policy for the router.

As another non-limiting example, an intent may include a prefix intent that specifies whether prefixes are allowed to be originated or propagated to a targeted fabric. The compiler, based on the fabric type of the targeted fabric, may create an API call to the fabric, which will cause devices or services to perform or not perform operations based on the intent.

As described above, benefits of intent-driven network management are expanded and/or enhanced with the performance of various checks, including pre-checks (e.g., to determine whether to implement a given intent) and post-checks (e.g., to determine whether the intent is being violated after implementation and/or whether implementation of the intent is causing other issues in the network), which are triggered by and traceable to an intent or related policy. Checks may include behavioral validation, which ensures that a product, service, or system meets the needs or desires of a customer and/or other identified stakeholders, and which also may refer to validating or verifying the outcome of an intent after having applied the intent. Checks may also include functional verification (an example of a pre-check) that assures that a change related to an intent is designed correctly. Functional verification may include various types of checks, including dry-run and inline verification. Dry-run verification prioritizes reducing contention over safety, and may allow a system to verify a change and then wait for an opportune moment to start making it, without blocking other network updates. The price of this flexibility is that by the change starts being made, other network updates might have invalidated the verification results. In contrast, inline verification may ensure that the verification result stays valid—but will do this at the cost of blocking other network updates until the application of the policy is successful. As such, verification processes performed by a system may be configured to comply with availability and time allowances imposed by the corresponding authority services (e.g., Service-Level Agreements (SLAs), etc.). Dry-run verifications may be performed by a token service (e.g., token service 205 of FIG. 2), for example by using a weak-committed-only replica of an authority (e.g., journal). Inline verification may be performed by an appropriate authority service (e.g., policy authority 214 of FIG. 2) with a live replica leveraging journal transactions to detect race conditions. Another type of check includes a change control, which determines whether a moment in time is the right moment to make a functionally valid change.

When applying or attempting to apply a policy (e.g., when a new intent proposal is received), a decision tree or related algorithm may be applied to determine or classify checks to be performed, where a policy can prescribe any subset of the checks. If a check about approvals is prescribed, then a change control check may be performed. If a check about correctness is prescribed, then a determination of whether the check should be performed before or after changing the network configuration. If the check should be performed before changing the network configuration, then a determination of whether the check fits into an SLA or Service-Level Objective (SLO) allowance is made-if so, an inline check may be performed, otherwise a dry-run check may be performed. If the check should be performed after changing the network configuration, then a determination of whether the check should continue to be performed after making the change is made-if so, a recurring check may be performed, otherwise one or more post-checks may be performed at any point between pending and in-sync statuses.

Figure 10:
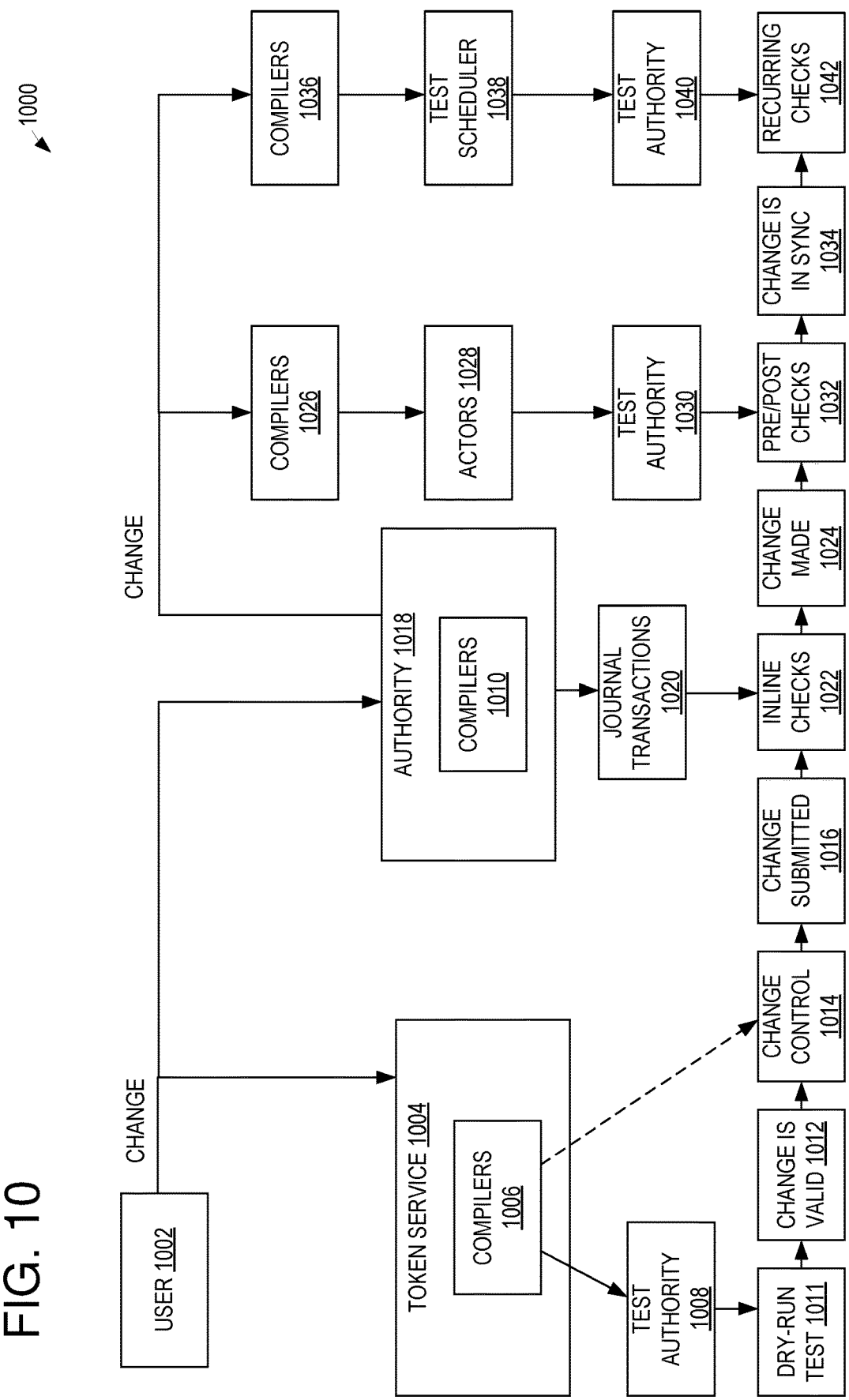
FIG. 10 shows an example of a network management system that utilizes compilers to perform tests of intents.

An example of different checks that may be run in correspondence with associated components of a network management system 1000 is shown in FIG. 10. A user 1002 issues a change (e.g., a proposed intent) for the network, which is provided to a token service 1004 and an authority 1018. The token service 1004 includes compilers 1006, which process the change and determine output for performing a verification of the change before applying the change to the network. The output of the compilers 1006 may be generated as described above with respect to FIGS. 7-9, and may be provided to a test authority 1008, which controls the performance of a dry-run test 1011. If the change is valid at 1012, the change is provided to change control service 1014. In some examples, the dry-run test may be skipped and the compilers 1006 may output change control information to the change control service 1014 to cause devices in the network to be updated to implement the change.

The change control service 1014 issues a change submitted indication at 1016 which is used to trigger inline checks 1022. The inline checks 1022 may be performed by an authority 1018 (e.g., a policy authority or other appropriate authority for the change), which includes compilers 1010 configured to output information for performing the inline checks 1022. For example, the compilers 1010 may generate the output as described above with respect to FIGS. 7-9. The inline checks 1022 may be configured to use information from the authority 1018 and/or other sources to determine whether the intent can be applied to targeted entities associated with the intent (e.g., performing type checks) based on rules, policies, and/or other considerations for the entities (e.g., considerations other than the existing/applied intent associations for the entities). In some examples, the compilers 1010 may additionally or alternatively be configured to generate output as described above for implementing the intent (e.g., output for adapters and/or actors to propagate updates to network devices/services to cause the network devices/services to be in compliance with the intent).

Once the change is confirmed to be made at 1024, pre- and/or post-checks 1032 may be performed, based on instructions from a test authority 1030. The test authority 1030 may receive instructions for the test from actors 1028, which receive output from compilers 1026 configured to process the approved change from the authority 1018 to generate output usable to perform the tests, as described above with respect to FIGS. 7-9. For example, the pre-checks may include checks performed based on information from the actors 1028 to check the intent prior to a change being made to apply the intent, whereas the post checks may use information from the journal transactions 1020 (e.g., an applied intents journal or other appropriate journal relating to the change) and/or other sources to determine an intended and/or expected state or behavior of the network and/or network devices and compare an observed state or behavior of the network and/or network devices after applying the change to determine whether the change has been made appropriately (e.g., the intent has been applied, the network is performing in compliance with the intent, and/or the network is performing in compliance with previously-applied intents). If the change is determined to be in sync at 1034, then any recurring checks 1042 may be performed based on instructions from a test authority 1040. The test authority 1040 may receive instructions from a test scheduler 1038, which generates test instructions using output form compilers 1036, configured to generate output usable to control the performance of the tests as described above with respect to FIGS. 7-9. For example, the output of the compilers 1006, 1010, 1026, and 1036 may respectively be tailored for associated consumers of the output, such as the devices performing or involved in the dry-run test 1011, inline checks 1022, post checks 1032, and recurring checks 1042. It is to be understood that in some examples, one or more of the test authorities 1008, 1030, and/or 1040 may effectively be the same device and/or service. For example, a same test authority may be used in performing the dry-run test 1011 and/or other validation checks as well as the pre- and/or post-checks 1032, or the same test authority may be used to perform the pre- and/or post-checks 1032 and the recurring checks 1042, all checks may be performed using the same test authority, etc. The output from any of the checks performed after the change is submitted to apply the intent to the network may be provided as feedback, for example, to the authority 1018 and/or to a drift correction service to selectively perform a mitigation responsive to determining an issue with the change (e.g., a validation issue in which the network and/or the network devices are determined to not behave as expected or in accordance with one or more of the intents according to an applied intents journal). Examples of mitigation to correct drift are described above, for example in reference to FIGS. 2 and 5, and described in more detail below with respect to FIG. 11.

As a non-limiting example, an intent may include a request to perform a span shift. The intent may be associated with a span entity, and the intent and association may be provided to a compiler. The compiler may identify a type of the span and devices at either end of the span, and from there determine artifacts that are to be generated (e.g., for some device types, the artifacts may include route maps that will depress advertisements for both sides of the span, while for other device types, files may be sent to a fabric to inform the fabric of the intent for nodes corresponding to the span). The compiler and/or another compiler may generate test directives for a static test analysis tool to determine if inter-Autonomous Zone intents are still met if the span shift intent is applied. One or more compilers may further generate pre- and/or post-checks for the live network to ensure traffic is actually being drained from the span after applying the intent.

Figure 11:
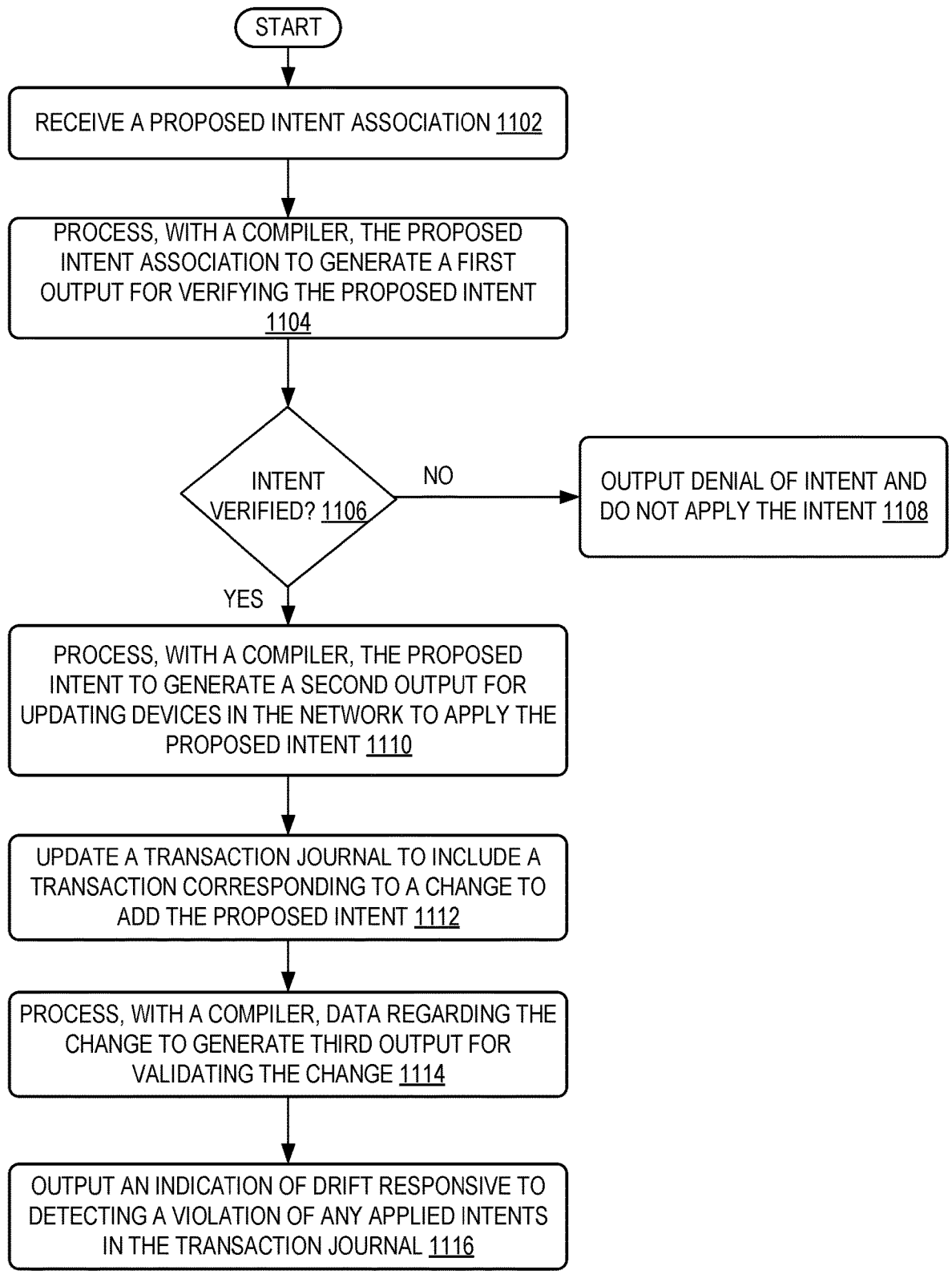
FIG. 11 is a flow chart of an example method for using compilers to perform checks in an intent-driven network management system.

FIG. 11 is a flow chart of an example method 1100 for using compilers to perform checks in an intent-driven network management system. For example, method 1100 may be performed using one or more components of system 100 of FIG. 1, system 200 of FIG. 2, systems shown in communication diagram 700 of FIG. 7, system 800 of FIG. 8, system 1000 of FIG. 10 and/or any combination thereof. At 1102, the method includes receiving a proposed intent association. For example, as described above, the intent association may be received in an intent language, and may describe a desired behavior for the network (e.g., an intent). The intent may be associated with one or more entities identified as a subject of the intent.

At 1104, the method includes processing, with a compiler, the proposed intent association to generate a first, verification testing output for verifying the proposed intent. For example, as described above, one or more pre-checks may be performed to determine whether the proposed intent is allowed to be applied—for example based on a simulation output that determines whether the intent is predicted to violate another, already applied intent or violate another condition for the network (e.g., an SLA, a fabric policy, a network policy, etc.). The one or more pre-checks may also include checks to determine if a change can be made to the network at that time. Examples of verifications are described in more detail above with respect to FIGS. 2, 5, 8, and 10.

At 1106, the method includes determining if the intent is verified. If the intent is not verified (e.g., the intent does not pass the one or more pre-checks, "NO" at 1106), the method includes outputting a denial of the proposed intent and not applying the intent (e.g., the intent may not be added as a change to a transaction journal of applied intents, and the network devices and/or services may be maintained without updates to apply the intent), as indicated at 1108. If the intent is verified (e.g., the intent passes the one or more pre-checks, "YES" at 1106), the method includes processing, with a compiler, the proposed intent to generate a second, network updating output for updating devices in the network to apply the proposed intent, as indicated at 1110. For example, as described above with respect to FIGS. 1, 4, and 7-9, the compiler may translate the intent into instructions for controlling one or more network devices to apply the intent to the network, where the instructions are customized for each of the network devices to be in a language and/or format that is compatible with and/or understood by the respective network devices.

At 1112, the method includes updating a transaction journal to include a transaction corresponding to a change to add the proposed intent. For example, the transaction journal may be updated as described above with respect to FIGS. 1-4 to allow the change to be tracked. At 1114, the method includes processing, with a compiler, data regarding the change to generate a third, validation testing output for validating the change. For example, as described above with respect to FIGS. 1, 2, 5, 8, and 10, one or more post-tests may be performed to determine whether the intent is being violated and/or whether the application of the intent has caused violations of any other intents, as well as to determine whether the network devices are in sync regarding the application of the intent in some examples. The compiler may generate instructions for performing the tests in a language and/or format that is compatible with and/or understood by the devices performing the tests and/or downstream devices involved in the tests. The compilers used at 1104, 1110, and 1114 may include first, second, and third compilers, respectively. The first, second, and third compilers may be different compilers in some examples, or in other examples, one or more of the operations of FIG. 11 may be performed by the same compiler (e.g., the second and third compilers may be the same compiler or the first and second compilers may be the same compiler). In some examples, one or more of the operations of method 1100 may be performed simultaneously and/or asynchronously in any suitable order (e.g., including a different order than as shown in FIG. 11). For example, one or more of the processing performed at 1104, 1110, and/or 1114 may be performed in parallel and/or in another order relating to the update of the journal at 1112.

At 1116, the method includes outputting an indication of drift (e.g., a validation issue) responsive to detecting a violation of any applied intents in the transaction journal. For example, as described in more detail above with respect to FIGS. 2 and 5, the drift may be handled by performing a mitigation operation, such as rolling back a transaction that caused the drift or adjusting an intent so that it allows for an exception relating to the violation. In other examples, the output may be an alert or a trigger for a ticket to be generated to allow an administrator or other user to determine how to address the violation.

Figure 12:
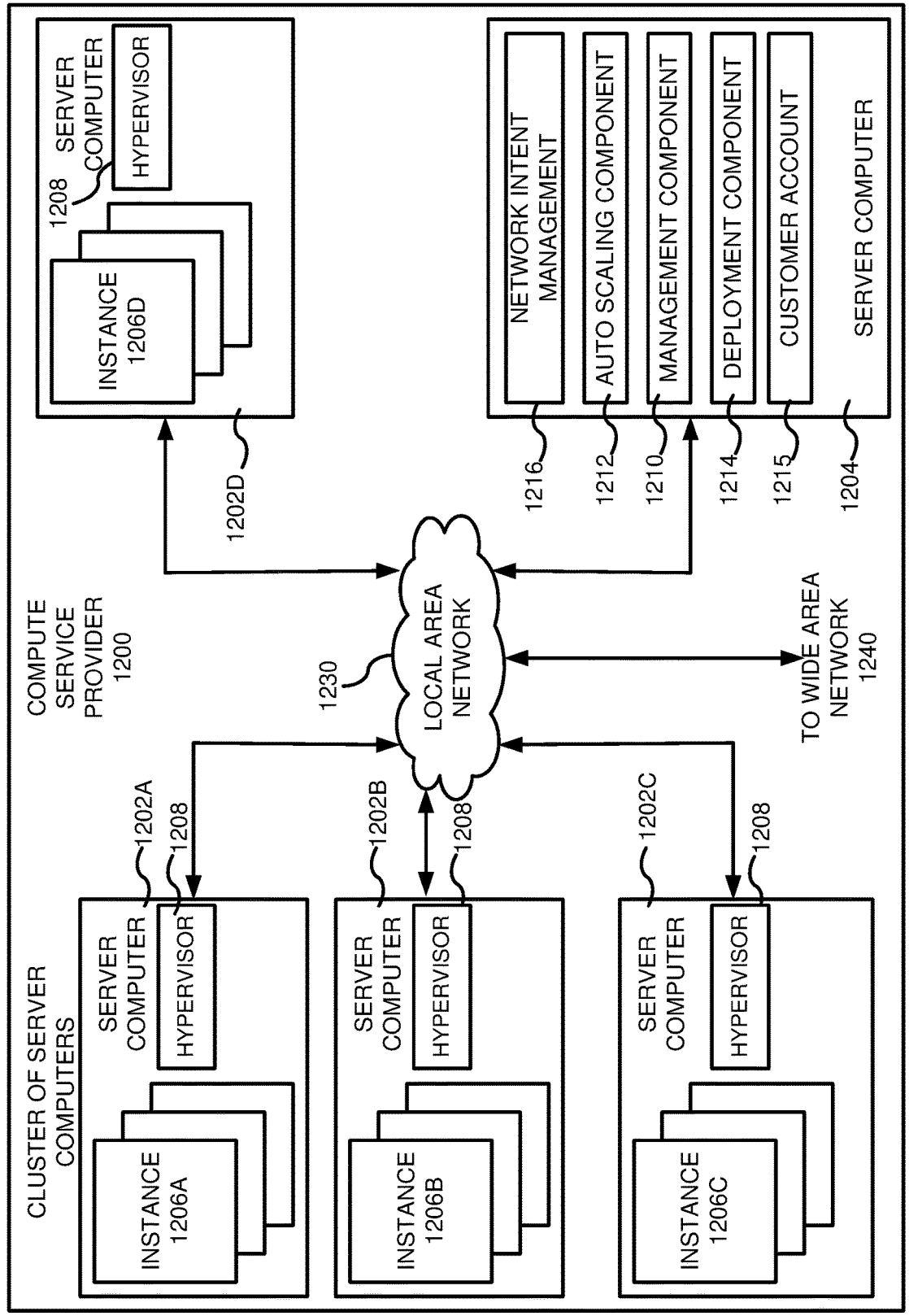
FIG. 12 is an example system diagram showing a plurality of virtual machine instances running in a multi-tenant environment.

FIG. 12 is a computing system diagram of a network-based compute service provider 1200 that illustrates one environment in which embodiments described herein can be used. By way of background, the compute service provider 1200 (i.e., the cloud provider) is capable of delivery of computing and storage capacity as a service to a community of end recipients. In an example embodiment, the compute service provider can be established for an organization by or on behalf of the organization. That is, the compute service provider 1200 may offer a "private cloud environment." In another embodiment, the compute service provider 1200 supports a multi-tenant environment, wherein a plurality of customers operate independently (i.e., a public cloud environment). Generally speaking, the compute service provider 1200 can provide the following models: Infrastructure as a Service ("IaaS"), Platform as a Service ("PaaS"), and/or Software as a Service ("SaaS"). Other models can be provided. For the IaaS model, the compute service provider 1200 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end customers access the compute service provider 1200 using networked client devices, such as desktop computers, laptops, tablets, smartphones, etc. running web browsers or other lightweight client applications. Those skilled in the art will recognize that the compute service provider 1200 can be described as a "cloud" environment.

In some implementations of the disclosed technology, the computer service provider 1200 can be a cloud provider network. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

With cloud computing, instead of buying, owning, and maintaining their own data centers and servers, organizations can acquire technology such as compute power, storage, databases, and other services on an as-needed basis. The cloud provider network can provide on-demand, scalable computing platforms to customers through a network, for example allowing customers to have at their disposal scalable "virtual computing devices" via their use of the compute servers and block store servers. These virtual computing devices have attributes of a personal computing device including hardware (various types of processors, local memory, random access memory ("RAM"), hard-disk and/or solid state drive ("SSD") storage), a choice of operating systems, networking capabilities, and pre-loaded application software. Each virtual computing device may also virtualize its console input and output ("I/O") (e.g., keyboard, display, and mouse). This virtualization allows customers to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the customer, the hardware associated with the virtual computing devices can be scaled up or down depending upon the resources the customer requires. Customers can choose to deploy their virtual computing systems to provide network-based services for their own use and/or for use by their customers or clients.

A cloud provider network can be formed as a number of regions, where a region is a separate geographical area in which the cloud provider clusters data centers. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs are the primary backbone locations linking customers to the cloud provider network, and may be collocated at other network provider facilities (e.g., Internet service providers, telecommunications providers) and securely connected (e.g., via a VPN or direct connection) to the availability zones. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

The cloud provider network may implement various computing resources or services that implement the disclosed techniques for TLS session management, which may include an elastic compute cloud service (referred to in various implementations as an elastic compute service, a virtual machines service, a computing cloud service, a compute engine, or a cloud compute service), data processing service (s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by customers of the cloud provider network, which may be provisioned in customer accounts.

The particular illustrated compute service provider 1200 includes a plurality of server computers 1202A-1202D. While only four server computers are shown, any number can be used, and large centers can include thousands of server computers. The server computers 1202A-1202D can provide computing resources for executing software instances 1206A-1206D. In one embodiment, the instances 1206A-1206D are virtual machines. As known in the art, a virtual machine is an instance of a software implementation of a machine (i.e., a computer) that executes applications like a physical machine. In the example of virtual machine, each of the servers 1202A-1202D can be configured to execute a hypervisor 1208 or another type of program configured to enable the execution of multiple instances 1206 on a single server. Additionally, each of the instances 1206 can be configured to execute one or more applications.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 1204 can be reserved for executing software components for managing the operation of the server computers 1202 and the instances 1206. For example, the server computer 1204 can execute a management component 1210. A customer can access the management component 1210 to configure various aspects of the operation of the instances 1206 purchased by the customer. For example, the customer can purchase, rent or lease instances and make changes to the configuration of the instances. The customer can also specify settings regarding how the purchased instances are to be scaled in response to demand. The management component can further include a policy document to implement customer policies. An auto scaling component 1212 can scale the instances 1206 based upon rules defined by the customer. In one embodiment, the auto scaling component 1212 allows a customer to specify scale-up rules for use in determining when new instances should be instantiated and scale-down rules for use in determining when existing instances should be terminated. The auto scaling component 1212 can consist of a number of subcomponents executing on different server computers 1202 or other computing devices. The auto scaling component 1212 can monitor available computing resources over an internal management network and modify resources available based on need.

A deployment component 1214 can be used to assist customers in the deployment of new instances 1206 of computing resources. The deployment component can have access to account information associated with the instances, such as who is the owner of the account, credit card information, country of the owner, etc. The deployment component 1214 can receive a configuration from a customer that includes data describing how new instances 1206 should be configured. For example, the configuration can specify one or more applications to be installed in new instances 1206, provide scripts and/or other types of code to be executed for configuring new instances 1206, provide cache logic specifying how an application cache should be prepared, and other types of information. The deployment component 1214 can utilize the customer-provided configuration and cache logic to configure, prime, and launch new instances 1206. The configuration, cache logic, and other information may be specified by a customer using the management component 1210 or by providing this information directly to the deployment component 1214. The instance manager can be considered part of the deployment component.

Customer account information 1215 can include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, etc. A network intent management component 1216 may include one or more of the components of system 100 of FIG. 1, system 200 of FIG. 2, system 800 of FIG. 8, and/or system 1000 of FIG. 10 and may be configured to provide all or a portion of the intent-driven network management described above with respect to FIGS. 1-11.

A network 1230 can be utilized to interconnect the server computers 1202A-1202D and the server computer 1204. The network 1230 can be a local area network (LAN) and can be connected to a Wide Area Network (WAN) 1240 so that end customers can access the compute service provider 1200. It should be appreciated that the network topology illustrated in FIG. 12 has been simplified and that many more networks and networking devices can be utilized to interconnect the various computing systems disclosed herein.

Figure 13:
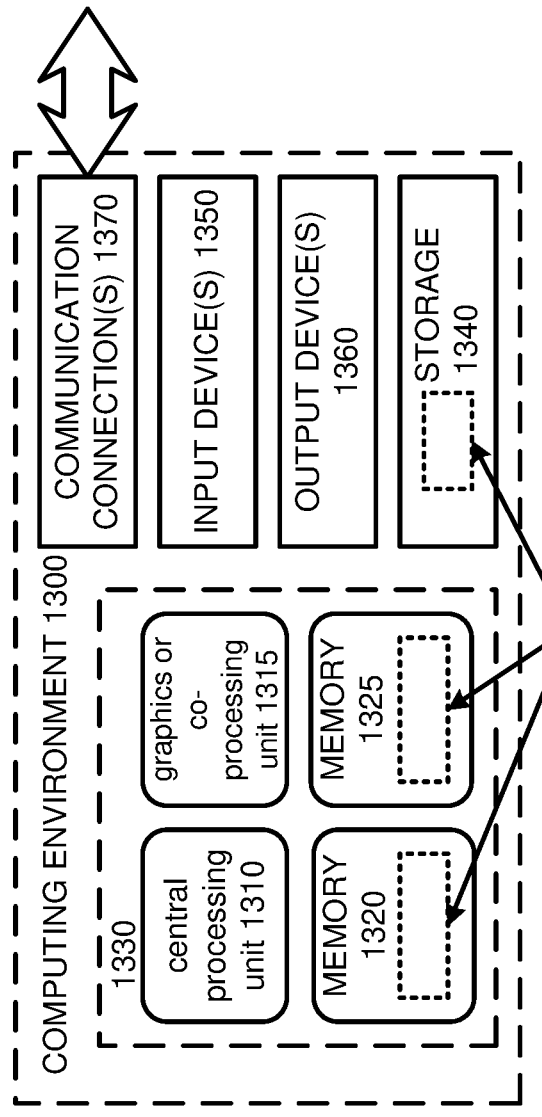
FIG. 13 depicts a generalized example of a suitable computing environment in which the described innovations may be implemented.

FIG. 13 depicts a generalized example of a suitable computing environment 1300 in which the described innovations may be implemented. The computing environment 1300 is not intended to suggest any limitation as to scope of use or functionality, as the innovations may be implemented in diverse general-purpose or special-purpose computing systems. For example, the computing environment 1300 can be any of a variety of computing devices (e.g., desktop computer, laptop computer, server computer, tablet computer, etc.).

With reference to FIG. 13, the computing environment 1300 includes one or more processing units 1310, 1315 and memory 1320, 1325. In FIG. 13, this basic configuration 1330 is included within a dashed line. The processing units 1310, 1315 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 13 shows a central processing unit 1310 as well as a graphics processing unit or co-processing unit 1315. The tangible memory 1320, 1325 may be volatile memory (e.g., registers, cache, RAM), non-volatile memory (e.g., ROM, EEPROM, flash memory, etc.), or some combination of the two, accessible by the processing unit(s). The memory 1320, 1325 stores software 1380 implementing one or more innovations described herein, in the form of computer-executable instructions suitable for execution by the processing unit(s).

A computing system may have additional features. For example, the computing environment 1300 includes storage 1340, one or more input devices 1350, one or more output devices 1360, and one or more communication connections 1370. An interconnection mechanism (not shown) such as a bus, controller, or network interconnects the components of the computing environment 1300. Typically, operating system software (not shown) provides an operating environment for other software executing in the computing environment 1300, and coordinates activities of the components of the computing environment 1300.

The tangible storage 1340 may be removable or non-removable, and includes magnetic disks, magnetic tapes or cassettes, CD-ROMs, DVDs, or any other medium which can be used to store information in a non-transitory way and which can be accessed within the computing environment 1300. The storage 1340 stores instructions for the software 1380 implementing one or more innovations described herein.

The input device(s) 1350 may be a touch input device such as a keyboard, mouse, pen, or trackball, a voice input device, a scanning device, or another device that provides input to the computing environment 1300. The output device(s) 1360 may be a display, printer, speaker, CD-writer, or another device that provides output from the computing environment 1300.

The communication connection(s) 1370 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, aspects of the disclosed technology can be implemented by software written in C++, Java, Perl, any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:

1. A computing system comprising:
a network management system including one or more services comprising one or more storage devices storing instructions executable to:
receive, at a token service including a first compiler, a request including a proposed intent identifying an expectation for behavior in a network and one or more intent associations of entities for the intent,
process the request with the first compiler by selectively generating first, verification testing output usable by a first test authority to verify whether the proposed intent is allowed to be applied to the network and second, network updating output usable by a change service to update network devices or services in the network to control the network devices or services to comply with the proposed intent,
receive, at an authority service, request data corresponding to the request, the authority service configured to update a transaction journal to include a transaction corresponding to a change to add the proposed intent for the network,
receive, at a second compiler, change data regarding the change from the authority service,
process, with the second compiler, the change data to generate third, validation testing output usable by a second test authority to perform a validation of the change, and
output an indication of a validation issue responsive to detecting a violation of one or more applied intents in the transaction journal based on the validation.

2. The computing system of claim 1, wherein the validation includes a comparison of monitored behavior of the network or network devices to an intended behavior of the network or the network devices.

3. The computing system of claim 1, wherein the proposed intent is provided to the first compiler in a first language, and wherein the first compiler is configured to generate one or both of the first, verification testing output or the second, network updating output in a second language that is different from the first language.

4. The computing system of claim 3, wherein the second language is selected to be compatible with the first or second test authority or the network devices or services.

5. The computing system of claim 3, wherein the first compiler is configured to generate the first, verification testing output in the second language that is compatible with the first test authority and to generate the second, network updating output in a third language that is compatible with one or more of the network devices or services.

6. The computing system of claim 1, wherein verifying whether the proposed intent is allowed to be applied to the network comprises running a simulation to determine an effect of the proposed intent on the network and determining if the effect of the proposed intent violates another intent in the transaction journal, and wherein the first, verification testing output is generated in a language or format that is compatible with one or more devices used for the simulation.

7. A computer-implemented method comprising:
receiving, at a compiler, a request including an intent identifying an expectation for behavior in a network and one or more entity associations for the intent;
for respective entities of the one or more entity associations, determining artifacts for the respective entities based on the intent; and
outputting, to consumers included in the respective entities, instructions based on the artifacts for the consumers.

8. The computer-implemented method of claim 7, wherein the data relating to the artifacts includes instructions to perform a verification of the intent prior to applying the intent to the network, and wherein the consumers include a test authority or test scheduler for configuring and performing the verification.

9. The computer-implemented method of claim 7, wherein the data relating to the artifacts includes instructions to control network devices or services to comply with the intent, and wherein the consumers include the network devices or services.

10. The computer-implemented method of claim 9, wherein the data is output responsive to a determination that the intent is verified as being allowed to be applied to the network.

11. The computer-implemented method of claim 10, wherein the determination that the intent is verified comprises determining that the intent is not predicted to violate one or more other applied intents of the network based on a performance of one or more tests.

12. The computer-implemented method of claim 7, wherein the data relating to the artifacts includes instructions to perform a validation of the intent.

13. The computer-implemented method of claim 12, wherein performing the validation comprises monitoring behavior of the network to determine observed behavior, comparing the observed behavior to intended behavior that is based on applied intents for the network, and outputting an indication of drift responsive to determining a difference between the intended behavior and the observed behavior or responsive to determining that the observed behavior violates an applied intent for the network.

14. The computer-implemented method of claim 7, wherein the intent is received at the compiler in a first language that is different from a native language used by the consumers.

15. The computer-implemented method of claim 14, wherein determining the artifacts for the respective entities based on the intent comprises determining an association between the intent and the respective entity using entity information and entity state retrieved from an authority service.

16. One or more computer-readable storage media comprising computer-executable instructions that, when executed, cause a computing system to perform a method comprising:
   receiving, at a compiler, a request including an intent identifying an expectation for behavior in a network and one or more associations of entities to the intent;
   processing, with the compiler, the intent using entity information and entity state retrieved from an authority service; and
   generating output for one or more consumers corresponding to the intent, the output including one or more of: data for performing a verification of the intent prior to applying the intent to the network, data for controlling network devices or services to comply with the proposed intent, or data to perform a validation of the intent.

17. The one or more computer-readable storage media of claim 16, wherein the intent is received in a first language that is different from a respective native language for the one or more consumers.

18. The one or more computer-readable storage media of claim 16, wherein the verification comprises determining an effect of the intent on the network and determining if the effect of the intent violates another intent for the network.

19. The one or more computer-readable storage media of claim 16, wherein the verification comprises determining if the intent is allowed to be applied to the network based on one or more rules regarding timing of applying changes to the network.

20. The one or more computer-readable storage media of claim 16, wherein the validation comprises performing a comparison of monitored behavior of the network or the network devices or services to an intended behavior of the network or the network devices or services.

* * * * *